(12) United States Patent
Mantravadi et al.

(10) Patent No.: US 8,229,708 B2
(45) Date of Patent: Jul. 24, 2012

(54) METHODS AND APPARATUS FOR SIGNAL AND INTERFERENCE ENERGY ESTIMATION IN A COMMUNICATION SYSTEM

(75) Inventors: Ashok Mantravadi, San Diego, CA (US); Fuyun Ling, San Diego, CA (US); Krishna Kiran Mukkavilli, San Diego, CA (US); Raghuraman Krishnamoorthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 921 days.

(21) Appl. No.: 11/563,627

(22) Filed: Nov. 27, 2006

(65) Prior Publication Data

US 2008/0123540 A1 May 29, 2008

(51) Int. Cl.
*G01R 15/00* (2006.01)
*G01R 21/00* (2006.01)
*H04B 15/00* (2006.01)
*H04B 1/10* (2006.01)
*H04B 3/46* (2006.01)
*H04B 1/00* (2006.01)
*H04B 17/00* (2006.01)
*H04B 1/04* (2006.01)
*H04B 1/12* (2006.01)
*H04L 25/08* (2006.01)

(52) U.S. Cl. ............ 702/191; 702/57; 702/60; 702/189; 375/227; 375/346; 455/63.1; 455/67.13; 455/114.2; 455/296

(58) Field of Classification Search .................. 702/57, 702/60, 65, 66, 69, 70–71, 189, 190, 193, 702/197–199; 370/203–210, 335, 342; 375/227, 375/316, 340, 346, 350; 455/63.1, 67.11, 455/67.13, 67.14, 114.2, 278.1, 296; 340/657, 340/661–664
See application file for complete search history.

(56) References Cited

U.S. PATENT DOCUMENTS 5,537,443 A * 7/1996 Yoshino et al. ............... 375/340
(Continued)

FOREIGN PATENT DOCUMENTS

EP      1392007      2/2004

OTHER PUBLICATIONS

International Search Report—PCT/US07/085540, International Search Authority—European Patent Office—Mar. 3, 2008.

(Continued)

*Primary Examiner* — Mohamed Charioui
*Assistant Examiner* — Ricky Ngon
(74) *Attorney, Agent, or Firm* — Ryan N. Farr (57) ABSTRACT

Methods and apparatus for signal and interference energy estimation in a communication system. In an aspect, a method includes setting a threshold value, and comparing a channel estimate to the threshold value to determine an interference estimate ($I_{est}$). The method also includes averaging the interference estimate ($I_{est}$) to determine average channel interference ($I_c$), and determining interference energy (I) based on the interference estimate ($I_{est}$) and the average channel interference ($I_c$). In another aspect, an apparatus includes threshold logic configured to set a threshold value and compare a channel estimate to the threshold value to determine an interference estimate ($I_{est}$). The apparatus includes averaging logic configured to average the interference estimate ($I_{est}$) to determine average channel interference ($I_c$), and summing logic configured to determine interference energy (I) based on the interference estimate ($I_{est}$) and average channel interference ($I_c$).

43 Claims, 7 Drawing Sheets

U.S. PATENT DOCUMENTS

| | | | | |
|---|---|---|---|---|
| 5,857,143 | A * | 1/1999 | Kataoka | 455/62 |
| 6,011,430 | A * | 1/2000 | Kim | 327/551 |
| 6,178,194 | B1 * | 1/2001 | Vasic | 375/136 |
| 7,072,618 | B1 * | 7/2006 | Strutt | 455/67.13 |
| 2002/0101908 | A1 | 8/2002 | Kim et al. | |
| 2002/0196879 | A1 * | 12/2002 | Iochi | 375/346 |
| 2004/0053592 | A1 * | 3/2004 | Reial | 455/303 |
| 2004/0071103 | A1 * | 4/2004 | Henttu | 370/320 |
| 2005/0152480 | A1 * | 7/2005 | Chang et al. | 375/343 |
| 2005/0272375 | A1 | 12/2005 | Ramesh | |
| 2007/0064156 | A1 * | 3/2007 | Liou et al. | 348/614 |

OTHER PUBLICATIONS

PCT Written Opinion of the International Searching Authority (PCT Rule 43*bis*.1), PCT/US2007/085540, Mar. 3, 2008, European Patent Office, Munich, Germany.

* cited by examiner

METHODS AND APPARATUS FOR SIGNAL AND INTERFERENCE ENERGY ESTIMATION IN A COMMUNICATION SYSTEM

BACKGROUND

1. Field

The present application relates generally to the operation of communication systems, and more particularly, to methods and apparatus for channel aid interference estimation in a communication system.

2. Background

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is very important for network administrators, content retailers, and service providers to have a way to distribute content and/or other network services in a fast and efficient manner and in such a way as to increase bandwidth utilization and power efficiency.

In current content delivery/media distribution systems, real time and non real time services are packed into a transmission frame and delivered to devices on a network. For example, a communication network may utilize Orthogonal Frequency Division Multiplexing (OFDM) to provide communications between a network server and one or more mobile devices. This technology provides a transmission frame having data slots that are packed with services to he delivered over a distribution network as a transmit waveform.

The performance of a communication system may depend on the performance of the communication channel between the network and a device. To characterize this performance, it is desirable to estimate both the channel (signal) and interference (noise) energy. For example, the interference energy comprises receiver noise as well as interference from other undesired signals in the environment. Once the interference energy is determined, it may be used to facilitate demodulation, field testing, or other functions related to the operation or improved performance of the communication system. Unfortunately, while it is relatively easy to get an estimate of combined signal and interference energy, it is more difficult to determine individual estimates.

Therefore, it would be desirable to have a system that operates to efficiently determine signal and interference energy in a communication system so that the performance of the system can be determined and/or optimized.

SUMMARY

In one or more aspects, an estimation system is provided that operates to determine signal and interference energy in a communication system. In an aspect, the system utilizes an adaptive threshold to determine a signal energy estimate and an interference energy estimate from a channel estimate. The interference energy estimate is then used to compensate the signal estimate to determine signal energy. The interference estimate is also compensated to determine interference energy. The adaptive threshold also allows the system to adjust to changing transmission environments. As a result, the determined signal and interference energy can be used to facilitate field testing, data demodulation or other functions related to the operation or performance of a communication system.

In an aspect, a method is provided for determining signal and interference energy. The method comprises setting a threshold value, and comparing a channel estimate to the threshold value to determine an interference estimate ($I_{est}$). The method also comprises averaging the interference estimate ($I_{est}$) to determine average channel interference ($I_c$), and determining interference energy (I) based on the interference estimate ($I_{est}$) and the average channel interference ($I_c$).

In another aspect, an apparatus is provided for determining signal and interference energy. The apparatus comprises threshold logic configured to set a threshold value and compare a channel estimate to the threshold value to determine an interference estimate ($I_{est}$). The apparatus also comprises averaging logic configured to average the interference estimate ($I_{est}$) to determine average channel interference ($I_c$), and summing logic configured to determine interference energy (I) based on the interference estimate ($I_{est}$) and the average channel interference ($I_c$).

In another aspect, an apparatus is provided for determining signal and interference energy. The apparatus comprises means for setting a threshold value, means for comparing a channel estimate to the threshold value to determine an interference estimate ($I_{est}$). The apparatus also comprises means for averaging the interference estimate ($I_{est}$) to determine average channel interference ($I_c$), and means for determining interference energy (I) based on the interference estimate ($I_{est}$) and the average channel interference ($I_c$).

In another aspect, a computer-readable medium is provided that has a computer program comprising instructions, which when executed by at least one processor, operation to determine signal and interference energy. The computer program comprises instructions for setting a threshold value, and instructions for comparing a channel estimate to the threshold value to determine an interference estimate ($I_{est}$). The computer program also comprises instructions for averaging the interference estimate ($I_{est}$) to determine average channel interference ($I_c$), and instructions for determining interference energy (I) based on the interference estimate ($I_{est}$) and the average channel interference ($I_c$).

In still another aspect, at least one processor is provided that is configured to perform a method for determining signal and interference energy. The method comprises setting a threshold value, comparing a channel estimate to the threshold value to determine an interference estimate ($I_{est}$), and averaging the interference estimate ($I_{est}$) to determine average channel interference ($I_c$). The method also comprises determining interference energy (I) based on the interference estimate ($I_{est}$) and the average channel interference ($I_c$).

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following description when taken in conjunction with the accompanying drawings wherein.

DETAILED DESCRIPTION

In one or more aspects, art estimation system is, provided that operates to determine channel and interference energy in a communication system. For the purpose of this description, aspects of the estimation system are described herein with reference to a communication network that utilizes OFDM to provide communications between a network server and one or more mobile devices. For example, in an aspect of an OFDM system, a frame is defined that comprises time division multiplex (TDM) pilot signals, frequency division multiplex (FDM) pilot signals, wide area identifiers (WIC), local area identifiers (LIC), overhead information symbols (OIS), and data symbols. The data symbols are used to transport services from the server to receiving devices. A data slot is defined as a set of 500 data symbols that occur over one OFDM symbol time. Additionally, an OFDM symbol time in the frame carries seven slots of data and one slot of pilot symbols.

Figure 1:
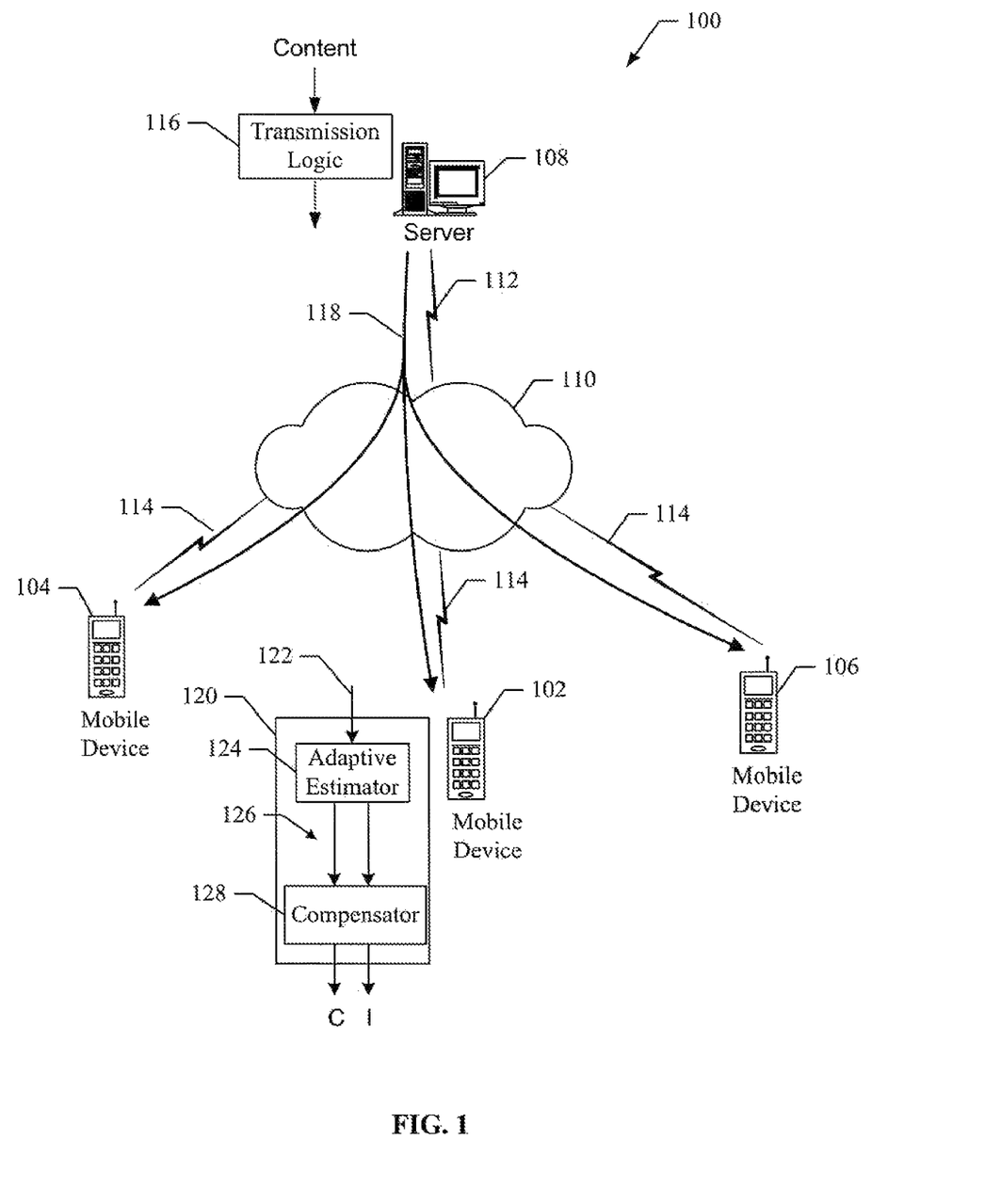
FIG. 1 shows a network that comprises an aspect of an estimation system.

FIG. 1 shows a network 100 that comprises ah aspect of an estimation system. The network 100 comprises mobile devices 102, 104, 106, a server 108, and a communication network 110. For the purpose of this description, it will be assumed that the network 110 operates to provide communications with and one or more of the mobile devices using OFDM technology; however, aspects of the noise estimation system are suitable for use with other transmission technologies as well.

In one aspect, the server 108 operates to provide services that may be subscribed to by devices in communication with the network 110. The server 108 is coupled to the network 110 through the communication link 112 that comprises any suitable communication link. The network 110 comprises any combination of wired and/or wireless networks that allows services to be delivered from the server 108 to devices in communication with the network 110, such as the device 102.

The devices 102, 104, and 106 in this aspect comprise mobile telephones that communicate with the network 110 through the wireless links 114. The wireless links 114 comprises wireless communication links based on OFDM technology; however, in other aspects the wireless links 114 may comprise other suitable wireless technologies that operate to allow devices to communicate with the network 110. For the remainder of this description, aspects of the noise estimation system are described with reference to the device 102; however, the aspects are equally applicable to the devices 104 and 106.

It should be noted that the network 110 may communicate with any number and/or types of devices within the scope of the aspects. For example, other devices suitable for use in aspects of the noise estimation system include, but are not limited to, a personal digital assistant (PDA), email device, pager, a notebook computer, mp3 player, video player, or a desktop computer.

The server 108 comprises content that includes real time and non real time services. For example, the services comprise multimedia content that includes news, sports, weather, financial information, movies, and/or applications, programs, scripts, or any other type of suitable content or service. Thus, the services may comprise video, audio or other information formatted in any suitable format.

The content is input to transmission logic 116, which processes the content to produce a transmission frame as described above. The transmission logic 116 operates to transmit the transmission frame over the network 106 as a transmit waveform 118. For example, the transmission frame may be distributed over the network 110 using a broadcast channel.

The device 102 receives the transmit waveform 118 at the estimation logic 120. The estimation logic 120 operates to determine the signal energy and the interference energy experienced at the device 102. For example, the signal energy is based on the signal power received at the device. The interference energy indicates one or more sources of noise, such as thermal noise, RF noise, and/or any other co-channel interference.

In an aspect, three consecutive symbols received in the transmit waveform 118 are converted into a filtered channel estimate 122. A more detailed description of the filtered, channel estimate 122 is provided in another section of this document. The filtered channel estimate 122 is input to an adaptive estimator 124. The adaptive estimator 124 operates to adaptively threshold the filtered channel estimate 122 to produce signal and interference estimates 126. The signal and interference estimates 126 are input to compensator 128. The compensator 128 operates to compensate the signal estimate using the interference estimate to produce signal energy (C). The interference estimate is also compensated to produce interference energy (I). The signal (C) and interference (I) energy describe the transmission channel performance experienced by the device 102 and therefore can be used to determine as well as improve the receiver performance.

Therefore, aspects, of an estimation system operate to determine signal and interference energy by performing one or more of the following functions.

a. Receive a transmit waveform.

b. Process the received transmit waveform to produce a filtered channel estimate.

c. Adaptively threshold the filtered channel estimate to determine a signal energy estimate and an interference energy estimate.

d. Compensate the signal energy estimate and the interference energy estimate to determine signal energy and interference energy.

As described above, the filtered channel estimate is processed by the adaptive estimator 124. A threshold value is used to threshold process the filtered channel estimate to produce a signal energy estimate. In an aspect, the adaptive estimator 124 operates to adjust the threshold value based on a previous signal energy estimate. For example, in an aspect, if the signal energy estimate is high, the threshold is decreased. If the signal energy estimate is low, the threshold is increased.

Therefore, aspects of an estimation system operate to efficiently determine signal and interference energy at a receiving device. It should be noted that the estimation system is not limited to the implementations described with reference to FIG. 1, and that other implementations are possible.

Figure 2:
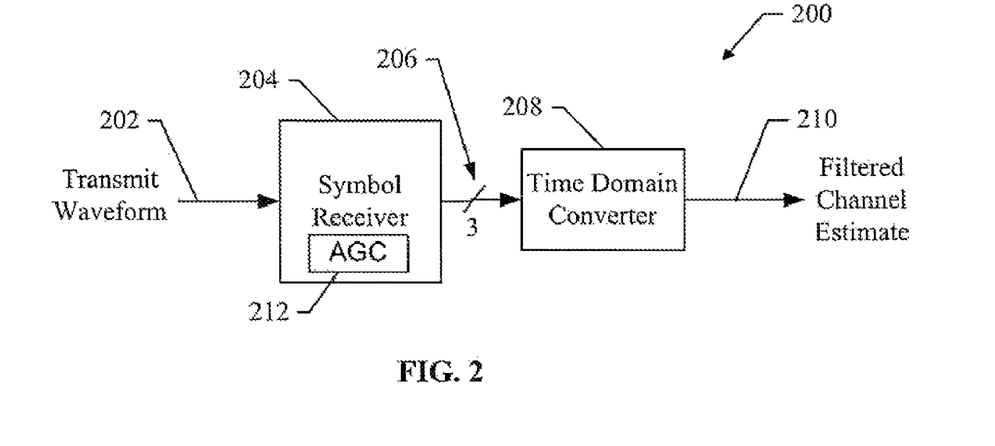
FIG. 2 shows an aspect of a receiver for use in an estimation system.

FIG. 2 shows an aspect of receiving logic 200 for use in an estimation system. The receiving logic 200 comprises symbol receiver 204 and time domain converter 208. In an aspect, the receiver 204 comprises hardware, software, or any combination thereof and operates to receive a transmit waveform. For example, the transmit waveform may be received over the OFDM network 110 shown in FIG. 1. The symbol receiver 204 operates to process the transmit waveform 202 to output pilot symbols 206 from three (3) consecutive OFDM symbols. For example, the symbol receiver 204 comprises an automatic gain control (AGC) circuit 212 that is used to receive and process the transmit waveform 202. It is assumed that interference is uncorrelated across the three symbols.

The time domain converter 208 comprises hardware, software, or any combination thereof and operates to receive the pilot symbols 206 and convert them to the time domain to produce a filtered channel estimate 210. For example, the filtered channel estimate 210 comprises 1024 taps where each tap comprises energy representing signal, interference, or some combination of signal and interference.

Figure 3:
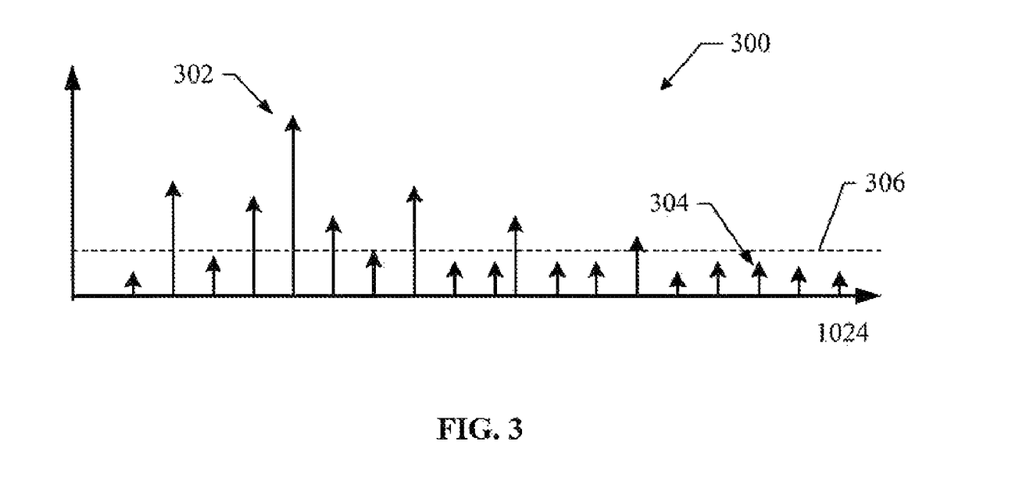
FIG. 3 illustrates a filtered channel estimate for use in an estimation system.

FIG. 3 shows an aspect of a filtered channel estimate 300 for use in an estimation system. For example, the filtered channel estimate 300 may be produced by the receiving logic 200 as described above.

The filtered channel estimate 300 comprises energy levels at 1024 taps. For example, the filtered channel estimate 300 comprises taps having relatively large energy levels, as shown at 302, which indicate signal energy (C). The filtered channel estimate 300 also comprises taps having relatively smaller energy levels, as shown at 304, which indicate interference energy.

In an aspect, the estimation system operates to set the level of an adaptive threshold 306, which is used to identify taps having largely interference energy (I) and taps having largely signal energy (C). For example, energy levels below the threshold 306 are determined to be interference energy and energy levels above or equal to the threshold 306 are determined to be signal energy. In one or more aspects, the level of the threshold is adaptively adjusted. For example, in an aspect, the threshold 306 is increased if the determined signal energy is low and decreased if the determined signal energy is high.

Figure 4:
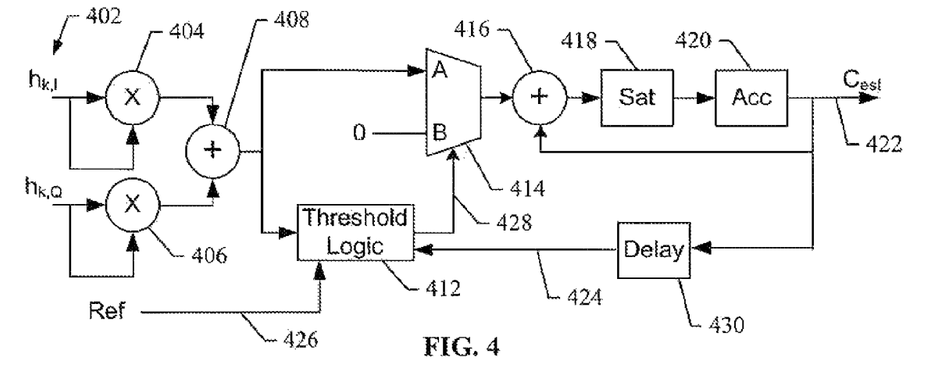
FIG. 4 shows an aspect of estimation logic for use in an estimation system.

FIG. 4 shows an aspect of estimation logic 400 for use in an estimation system. For example, the estimation logic 400 is suitable for use as the adaptive estimator 124 shown in FIG. 1. In one or more aspects, the estimation logic 400 comprises a CPU, processor, gate array, hardware logic, virtual machine, software, and/or any combination of hardware and software. For example, in an aspect, the estimation logic 400 may be implemented completely in hardware through the use of analog and/or digital circuitry. In another aspect, the estimation logic 400 may be implemented using a combination of hardware and software through the use of programmable gate arrays, memories, and/or other programmable logic. In another aspect, the estimation logic 400 may be implemented completely in software as a computer program comprising instructions that are executed by at least one processor.

Multipliers 404, 406 operate to square I and Q samples, respectively, of a filtered channel estimate 402 and provide the results to adder 408. The adder 408 outputs the sum of the squares to a selector 414 and threshold logic 412. The threshold logic 412 operates to compare the adder 408 output to an adaptive threshold value.

In an aspect, the threshold logic 412 operates to set an initial threshold level based on a reference signal 426. For example, the reference signal 426 may be based on a reference target for a received signal strength indicator (RSSI). However, the initial threshold level may be based on any other parameter or indicator. The threshold logic 412 compares the output of the adder 408 to the current threshold value and produces a selection signal 428 that is set to a first state (A) if the adder 408 output is greater than or equal to the threshold value, and a second state (B) if the adder 408 output is less than the threshold value. The threshold logic 412 also keeps track of the number of samples ($N_c$) that are greater than or equal to the threshold value and the number of samples ($N_i$) that are below the threshold value The selection signal 428 is input to a selector 414. The selector 414 operates to receive the output from the adder 408 and a fixed value of zero (0). The selector 414 operates to select one of its inputs to provide at its output based on the selection signal 428. If the selection signal 428 is at the first state (A), then the selector 414 selects the output of the adder 408 to provide at the selector 414 output. If the selection signal 428 is at the second state (B), then the selector 414 selects the fixed value (0) to provide at the selector 414 output. Thus, based on the threshold value used by the threshold logic 412, the selector 414 will pass only those "sum of squares" values output from the adder 408 that are greater than or equal to tire threshold value.

The output of the selector 414 is input to adder 416. The adder 416 operates to add the output of the selector 414 to a feedback signal that represents a signal estimate ($C_{est}$) 422. The signal estimate ($C_{est}$) represents largely signal energy plus some small amount of interference energy. The output of the adder 416 is input to saturation logic 418, which provides signal limiting functionality. The output of the saturation logic 418 is input to accumulation logic 420, which accumulates the energy over a number of samples to produce the signal estimate ($C_{est}$) 422.

As part of operation of the threshold logic 412, the signal estimate ($C_{est}$) 422 is also input to tire threshold logic 412 after passing through delay logic 430. For example, in an aspect, the threshold is adapted based on a signal estimate determine in a previous frame. Thus, the signal estimate ($C_{est}$) 422 is input to the delay logic 430 and a delayed version 424 of the signal estimate ($C_{est}$) 422 is output from the delay logic 430 and input to the threshold logic 412. The threshold logic 412 operates to adjust the current threshold value based on the delayed version 424 of the signal estimate ($C_{est}$) 422. For example, as the signal estimate ($C_{est}$) 422 increases, the threshold logic 412 decreases the threshold value, and as the signal estimate ($C_{est}$) 422 decreases, the threshold logic 412 operates to increase the threshold value.

In an aspect, the estimation system comprises a computer program having one or more program instructions ("instructions") stored on a computer-readable medium, which when executed by at least one processor, provide the functions of the estimation system described herein. For example, instructions may be loaded into the estimation logic 400 from a computer-readable media, such as a floppy disk, CDROM, memory card, FLASH memory device, RAM, ROM, or any other type of memory device. In another aspect, the instructions may be downloaded into the estimation logic 400 from an external device or network resource. The instructions, when executed by the estimation logic 400 operate to provide aspects of an-estimation, system as described herein.

Thus, the estimation logic 400 operates to determine a signal estimate ($C_{est}$) in a communication network as experienced at a receiving device. It should be noted that the estimation logic 400 is just one implementation and the other implementations are possible within the scope of the various aspects.

Figure 5:
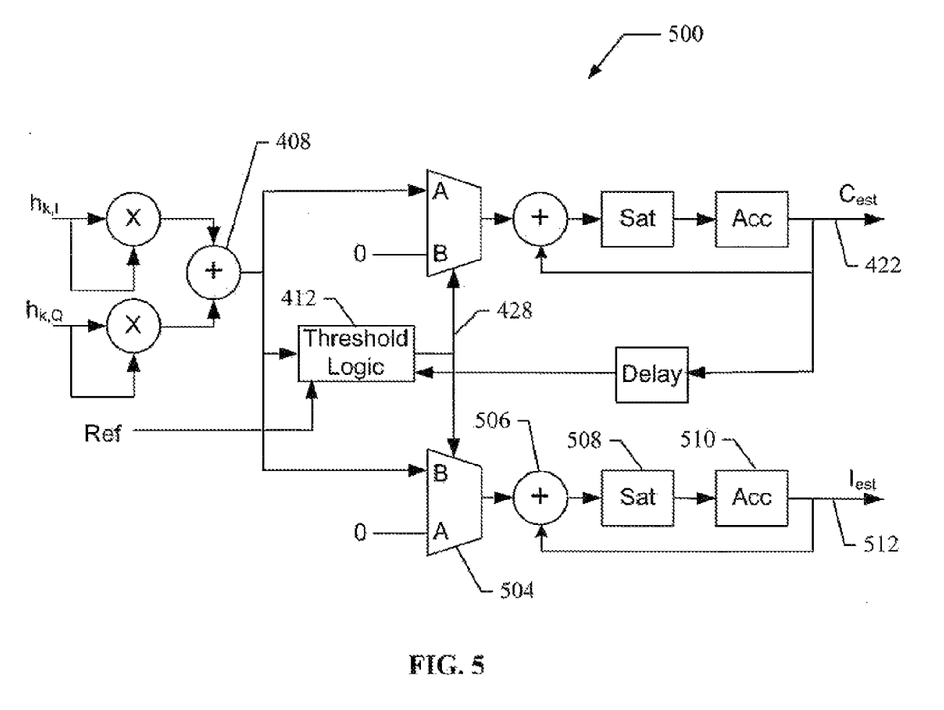
FIG. 5 shows an aspect of estimation logic for use in an estimation system.

FIG. 5 shows an aspect of estimation logic 500 for use in an estimation system. For example, the estimation logic 500 is suitable for use as the adaptive estimator 124 shown in FIG. 1. The estimation logic 500 comprises the estimation logic 400 with additional functionality to determine an interference estimate ($I_{est}$) 512.

The estimation logic 500 comprises a CPU, processor, gate array, hardware logic, virtual machine, software, and/or any combination of hardware and software. For example, in an aspect, the estimation logic 500 may be implemented completely in hardware through the use of analog and/or digital circuitry. In another aspect, the estimation logic 500 may be implemented using a combination of hardware and software through the use of programmable gate arrays, memories, and/or other programmable logic. In another aspect, the estimation logic 500 may be implemented completely in software as a computer program comprising instructions that are executed by at least one processor.

As described above, the adder 408 outputs the sum of the squares to the threshold logic 412. The sum of squares is also input to selector 504. The selector 504 receives the selection signal 428, which is set to a first state (A) if the adder 408 output is greater than or equal to the current threshold value, and a second state (B) if the adder 408 output is less than the current threshold value. The selector 504 receives the output of the adder 408 and a fixed value of zero (0) as inputs. Based on the selection signal 428, the selector 504 selects one of its inputs to be provided at its output. For example, if the selection, signal 428 is at the first state (A) then the selector 504 outputs the fixed value (0). If the selection signal 428 is at the second state (B) then the selector 504 outputs the value received from the adder 408. Thus, based on the current threshold value used by the threshold logic 412, the selector 504 will pass only those "sum of squares" values that are less than the threshold value.

The output of the selector 504 is input to adder 506. The adder 506 operates to add the output of the selector 504 to a feedback signal that represents an interference, estimate ($I_{est}$) 512. The interference estimate ($I_{est}$) 512 represents energy that is considered to be interference. The output of the adder 506 is input to saturation logic 508, which provides signal limiting. The output of the saturation logic 508 is input to accumulation logic 510, which accumulates the energy over a number of samples to produce the interference estimate ($I_{est}$) 512.

As described above, the threshold logic 412 operates to adjust the current threshold value based on the delayed version of the signal estimate ($C_{est}$) 422. For example, as the signal, estimate 422 increases, the threshold logic 412 operates to decrease the threshold value, and as the signal energy 422 decreases, the threshold logic 412 operates to increase the threshold value.

In an aspect the estimation system comprises a computer program having one or more program instructions ("instructions") stored on a computer-readable medium, which when executed by at least one processor, provides the functions of the estimation system described herein. For example, instructions may be loaded into the estimation logic 500 from a computer-readable media, such as a floppy disk, CDROM, memory card, FLASH memory device, RAM, ROM, or any other type of memory device. In another aspect, the Instructions may be downloaded into the estimation logic 500 from an external device or network resource. The instructions, when executed by the estimation logic 500 operate to provide aspects of an estimation system as described herein.

Thus, the estimation logic 500 operates to determine a channel estimate and an interference estimate in a communication network as experienced at a receiving device. It should he noted that the estimation logic 500 is just one implementation and the other implementations are possible within the scope of the aspects.

Signal and Interference Energy Determination

Once the Signal and interference estimates are determined, aspects of the estimation system operate to determine signal (C) and interference (I) energy.

Figure 6:
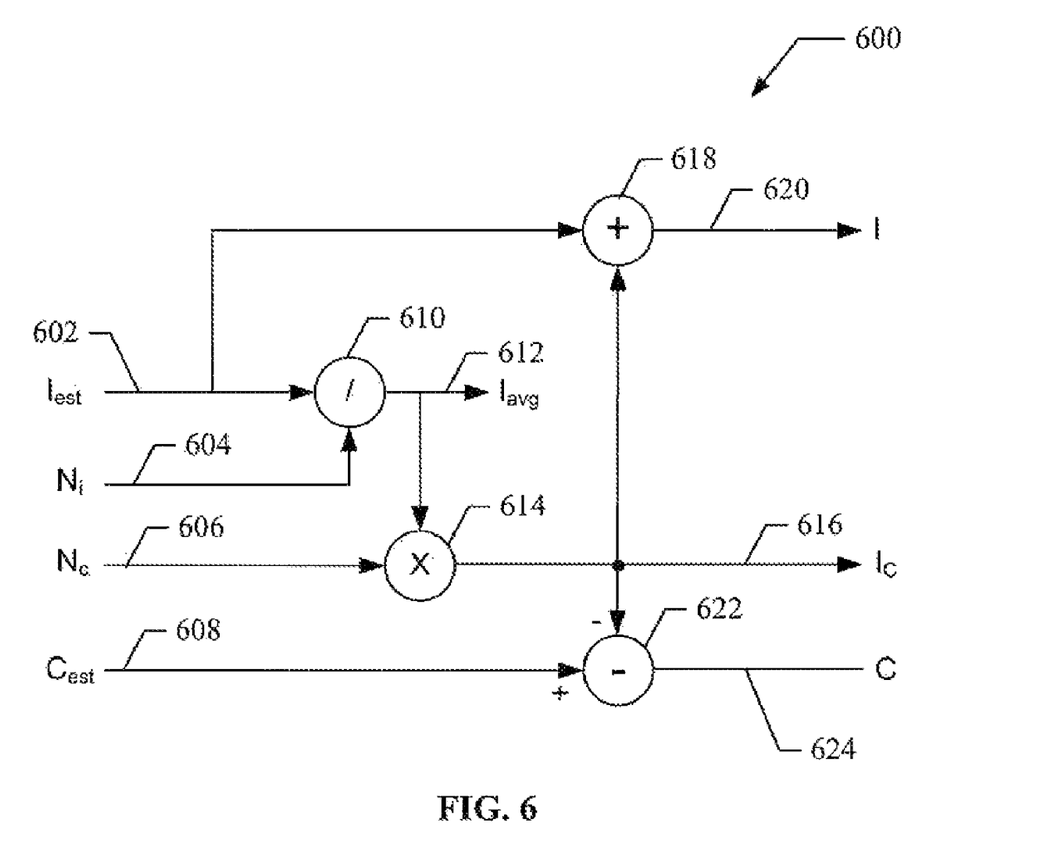
FIG. 6 shows an aspect of compensation logic for use in an estimation system.

FIG. 6 shows an aspect of compensation logic 600 for use in an estimation system. For example, the compensation logic 600 is suitable for as the compensator 128 shown in FIG. 1.

The compensation logic 600 comprises a CPU, processor, gate array, hardware logic, virtual machine, software, and/or any combination of hardware and software. For example, in an aspect, the compensation logic 600 may be implemented completely in hardware through the use of analog and/or digital circuitry. In another aspect, the compensation logic 600 may be implemented using a combination of hardware and software through the use of programmable gate arrays, memories, and/or other programmable logic. In another aspect, the compensation logic 600 may be implemented completely in software as a computer program comprising instructions that are executed by at least one processor.

In an aspect, an interference estimate $I_{est}$ can be processed to provide an average interference estimate $I_{avg}$. For example, divide logic 610 operates to divide the interference estimate 602 by the number of samples ($N_i$) 604 to produce the average interference estimate $I_{avg}$ 612.

For example, the average interference estimate $I_{avg}$ can be expressed as follows.

$$I_{avg}=I_{est}/N_i$$

Once $I_{avg}$ is determined, the amount of interference energy in the signal estimate ($C_{est}$) can be determined. In an aspect, the multiplier 614 operates to multiply the number of samples ($N_c$) 606 by $I_{avg}$ 612. This results in the signal interference ($I_c$) 616, which can be expressed as follows.

$$I_c=I_{avg}*N_c$$

Once $I_c$ is determined, the signal energy (C) can be determined. In an aspect, subtraction logic 622 operates to subtract the signal interference ($I_c$) 616 from the signal estimate ($C_{est}$) 608. This results in the signal energy (C) 624, which can be expressed as follows.

$$C=C_{est}-I_c$$

Furthermore, $I_c$ is used to determine the interference energy (I). In an aspect, adder 618 operates to add the signal interference ($I_c$) 616 to the interference estimate ($I_{est}$) 602. This results in the interference energy (I) 620, which can be expressed as follows.

$$I=I_{est}+I_c$$

In an aspect, the estimation system comprises a computer program having one or more program instructions ("instructions") stored on a computer-readable medium, which when executed by at least one processor, provides the functions of the estimation system described herein. For example, instructions may be loaded into the compensation logic 600 from a computer-readable media, such as a floppy disk, CDROM, memory card, FLASH memory device, RAM, ROM, or any other type of memory device. In another aspect, the instructions may be downloaded into the compensation logic 600 from an external device or network resource. The instructions, when executed by the compensation logic 600 operate to provide aspects of an estimation system as described herein.

Thus, the compensation logic 600 operates to determine signal energy and interference energy in a communication network as experienced at a receiving device. It should be noted that the compensation logic 600 is just one implementation and the other implementations are possible within the scope of the aspects.

Figure 7:
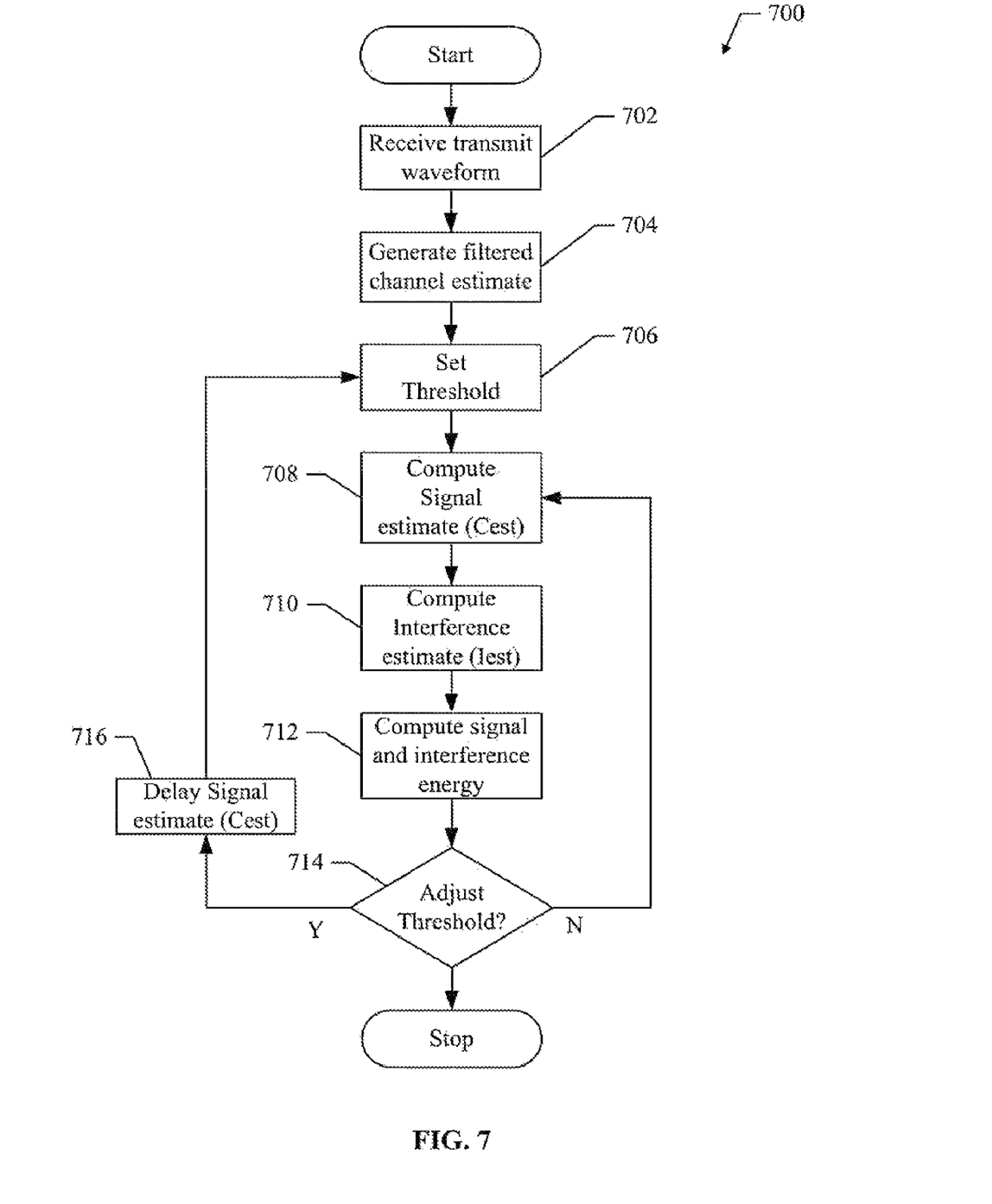
FIG. 7 shows a method for use in an estimation system.

FIG. 7 shows an aspect of a method 700 for providing an estimation system. For example, in an aspect, the estimation logic 500 and the compensation logic 600 are configured to perform the method 700 as describe below.

At block 702, a transmit waveform is received. For example, the transmit waveform is received over an OFDM network and comprises some number of OFDM symbols. In an aspect, the waveform is received at receiving logic 200.

At block 704, a filtered channel estimate is generated. For example, the filtered channel estimate comprises 1024 taps where each tap comprises some amount of energy. In an aspect, the receiving logic 200 operates to generate the filtered channel estimate from the received transmit waveform.

At block 706, a threshold value is set. For example, the threshold value is used to process the filtered channel estimate. For example, the threshold value may be set to an initial value based on a reference target associated with a RSSI. In an aspect, the threshold is set based on a delayed version of a signal estimate that is determined at block 708. In an aspect, the threshold logic 412 operates to set the threshold value.

At block 708, a signal estimate ($C_{est}$) is computed. For example, the signal estimate ($C_{est}$) is computed by accumulating the energy in the filtered channel estimate that is greater than or equal to the threshold value. In an aspect the estimation logic 500 operate to compute the signal estimate ($C_{est}$).

At block 710, an interference estimate ($I_{est}$) is computed. For example, the interference estimate ($I_{est}$) is computed by accumulating the energy in the filtered channel estimate that is less than the threshold value. In an aspect the estimation logic 500 operate to compute the interference estimate ($I_{est}$).

At block 712, signal energy (C) and interference energy (I) are computed. For example, the signal energy (C) is computed by removing the channel interference ($I_c$) energy from the signal energy estimate ($C_{est}$). The interference energy (I) is computed by adding the channel interference ($I_c$) energy to the interference energy estimate ($I_{est}$). In an aspect, the compensation logic 600 operates to compute the signal (C) and interference (I) energy.

At block 714, a test is performed to determine if the threshold needs to be adjusted. For example, the threshold can be adjusted based on the signal estimate or the interference estimate. In an aspect, if the threshold needs to be adjusted, the method proceeds to block 716. If the threshold does not need to he adjusted, the method proceeds to block 708.

At block 716, the signal energy estimate ($C_{est}$) is delayed. For example, the threshold logic 412 operates to adjust the threshold value based on the signal energy estimate ($C_{est}$) determined in a previous frame. In an aspect, the delay logic 430 operates to delay the signal energy estimate ($C_{est}$) and provide a delayed version of the signal energy estimate to the threshold logic 412.

Thus, the method 700 operates to determine signal and interference energy in a communication system as experienced by a receiving device. It should be noted that the method 700 represents just one implementation and the changes, additions, deletions, combinations or other modifications of the method 700 are possible within the scope of the aspects.

Alternative Estimators

Figure 8:
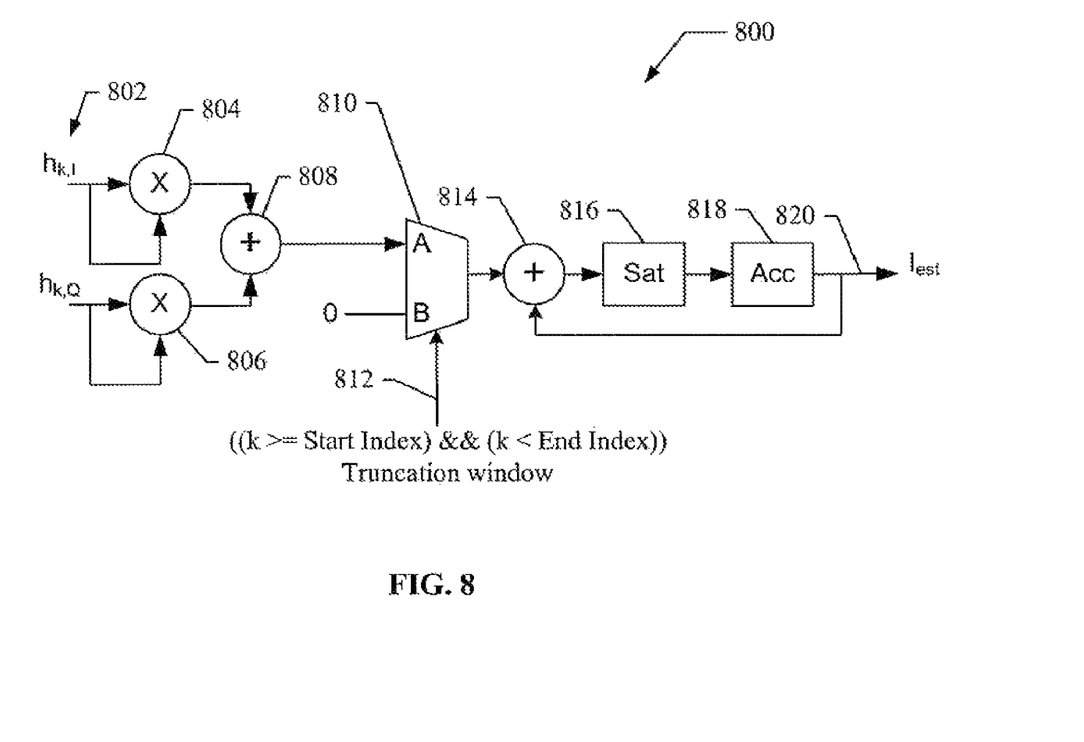
FIG. 8 shows an aspect of estimation logic for use in an estimation system.

FIG. 8 shows an aspect of estimation logic 800 for use in an estimation system. For example, the estimation logic 800 is suitable for use as part of the adaptive estimator 124 shown in FIG. 1. In one or more aspects, the estimation logic 800 comprises a CPU, processor, gate array, hardware logic, virtual machine, software, and/or any combination of hardware and software. For example, in an aspect, the estimation logic 800 may be Implemented completely in hardware through the use of analog and/or digital circuitry. In another aspect, the estimation logic 800 may be implemented using a combination of hardware and software through the use of programmable gate arrays, memories, and/or other programmable logic. In another aspect, the estimation logic 800 may be implemented completely in software as a computer program comprising instructions that are executed by at least one processor.

Multipliers 804, 806 operate to square I and Q samples, respectively, of a filtered channel estimate 802 and provide the results to adder 808. The adder 808 outputs the sum of the squares to a selector 810.

The selector 810 operates to receive the output from the adder 808 and a fixed value of zero (0). The selector 810 operates to select one of its inputs to provide at its output based on a selection signal 812. The selection signal 812 is based on the value of k, which forms a truncation window. For example, it is assumed that there is no signal component in a part of the interference estimate within the truncation window. If k is greater than or equal to a start index and less than an end index that defines the truncation window, then the selector signal 812 is set to a first state (A). Otherwise, the selector signal 812 is set to a second state (B.) If the selector signal 812 is in the first state (A), then the selector 810 selects the output of the adder 408 to provide at the selector 810 output. If the selection signal 812 is at the second state (B), then the selector 810 selects the fixed value zero (0) to provide at the selector 810 output. Thus, the selector 810 will only pass "sum of squares" values provided by the adder 808 when k is within the truncation window.

The output of the selector 810 is input to adder 814. The adder 814 operates to add the output of the selector 810 to a feedback signal that represents an interference estimate ($I_{est}$) 820. The output of the adder 814 is input to saturation logic 816, which provides signal limiting functionality. The output of the saturation logic 816 is input to accumulation logic 818, which accumulates the energy over a number of samples to produce the interference estimate ($I_{est}$) 820.

As a result, the estimation logic 800 operates to provide an interference estimate ($I_{est}$) based on a truncation window according, to the following;

$$I_{est} = \frac{4}{3}\left(\frac{1024}{W}\right) \sum_{k=n_0}^{n_0+W-1} |\tilde{h}_k|^2$$

where $n_0$ is the starting index of the truncation window, W is the length of the truncation window and $\tilde{h}_k$ represents tap k in the filtered channel estimate. The accumulated energy in the truncation window is sealed to reflect the total interference level seen at the receiver.

The sum of the signal and interference energy is the total received energy (R) and is estimated from the energy of the received signal samples in the automatic gain control (AGC) block (i.e., block 212 shown in FIG. 2).

$$R = C + I = 20.33\frac{E_{meas}}{E_{ref}}$$

In the above equation, the AGC 212 attempts to scale the received signal such that it has an energy level of 20.33. Clearly, the target of 20.33 is specific to one implementation and can be any other number in other implementations. The ratio $E_{meas}/E_{ref}$ is a measure that indicates how much the actual received energy has deviated from the target and can be estimated in the AGC 212.

Based on the estimate of the interference, and the total received power, the signal energy can be estimated as follows.

$$C_{est} = R - I_{est}$$

The above estimator for interference and signal energy has the advantage that it does not depend on the threshold setting. However, it assumes that no signal component is present in the truncation window.

In an aspect, the estimation logic 800 is combined with the estimation logic 500. In this aspect, the channel estimate taps that are below a selected threshold OR fall in the truncation window are considered interference and their energy is accumulated to yield the interference energy. The signal energy is obtained from the taps that are above the selected threshold AND outside the truncation window. The signal energy can also be obtained from the interference energy and an estimate of the total energy from the AGC 212.

In an aspect, the estimation system comprises a computer program having one or more program instructions ("instructions") stored on a computer-readable medium, which when executed by at least one processor, provide the functions of the estimation system described herein. For example, instructions, may be loaded into the estimation logic 800 from a computer-readable media, such as a floppy disk, CDROM, memory card, FLASH memory device, RAM, ROM, or any other type of memory device. In another aspect, the instructions may be downloaded, into the estimation logic 800 from an external device or network resource. The instructions, when executed by the estimation logic 800 operate to provide aspects of an estimation system as described herein.

Thus, the estimation logic 800 operates to determine an interference estimate ($I_{est}$) in a communication network as experienced at a receiving device. It should be noted that the estimation logic 800 is just one implementation and the other implementations are possible within the scope of the various aspects.

In other aspects, the estimation system may be modified to determine interference estimates ($I_{est}$) based on other algorithms. For example, the system is operable to determine interference estimates ($I_{est}$) based on the following.

A. Interference estimate ($I_{est}$) based on a difference of channel estimates.

$$R = C + I = 20.33 \frac{E_{meas}}{E_{ref}}$$

$$I_{est} = 4\left(\frac{512}{W}\right) \sum_{k=n_0}^{n_0+W-1} |\tilde{h}_k(n) - \tilde{h}_k(n-1)|^2$$

B. Interference estimate ($I_{est}$) based on a difference of channel estimates before time-filtering;

$$R = C + I = 20.33 \frac{E_{meas}}{E_{ref}}$$

$$I_{est} = \frac{1}{2}\left(\frac{512}{W}\right) \sum_{k=n_0}^{n_0+W-1} |\hat{h}_k(n) - \hat{h}_k(n-\delta)|^2$$

where δ=1 or 2 typically. The channel estimate before time-filtering can be obtained by taking an IFFT of the pilot carrier observations followed by a phase ramp operation to account for the staggering phase of the pilot interlace.

Estimators A and B above are based on taking differences of channel estimates from different OFDM symbols. If the taps contain a signal component, the interference estimate has a contribution from the variation of this component across the different OFDM symbols. This contribution is minimized by accumulating the interference over the truncation window only. In addition, the interference energy can vary across different OFDM symbols due to differences in the AGC gain applied in these symbols. Since the AGC gain is known at the receiver, the gain variation can be compensated. For instance, estimator B can be modified as;

$$I_{est} = \frac{\sum_{k=n_0}^{n_0+W-1} |\hat{h}_k(n) - \hat{h}_k(n-1)|^2}{G_{n-1} + G_n}$$

where $G_n$ is the AGC gain in OFDM symbol n.

In another aspect, an estimator is provided based on channel estimates before time-filtering in three OFDM symbols.

$$I_{est} = \frac{1}{6P} \sum_{k=0}^{P-1} |\hat{h}_k(n) - 2\hat{h}_k(n-1) + \hat{h}_k(n-2)|^2$$

where $\hat{h}_k(n)$ is tap k of the channel estimate before time-filtering in OFDM symbol n. Such an estimator has the advantage that it removes the signal as well as any linear time variations in the signal from the interference estimate but requires additional computation.

Figure 9:
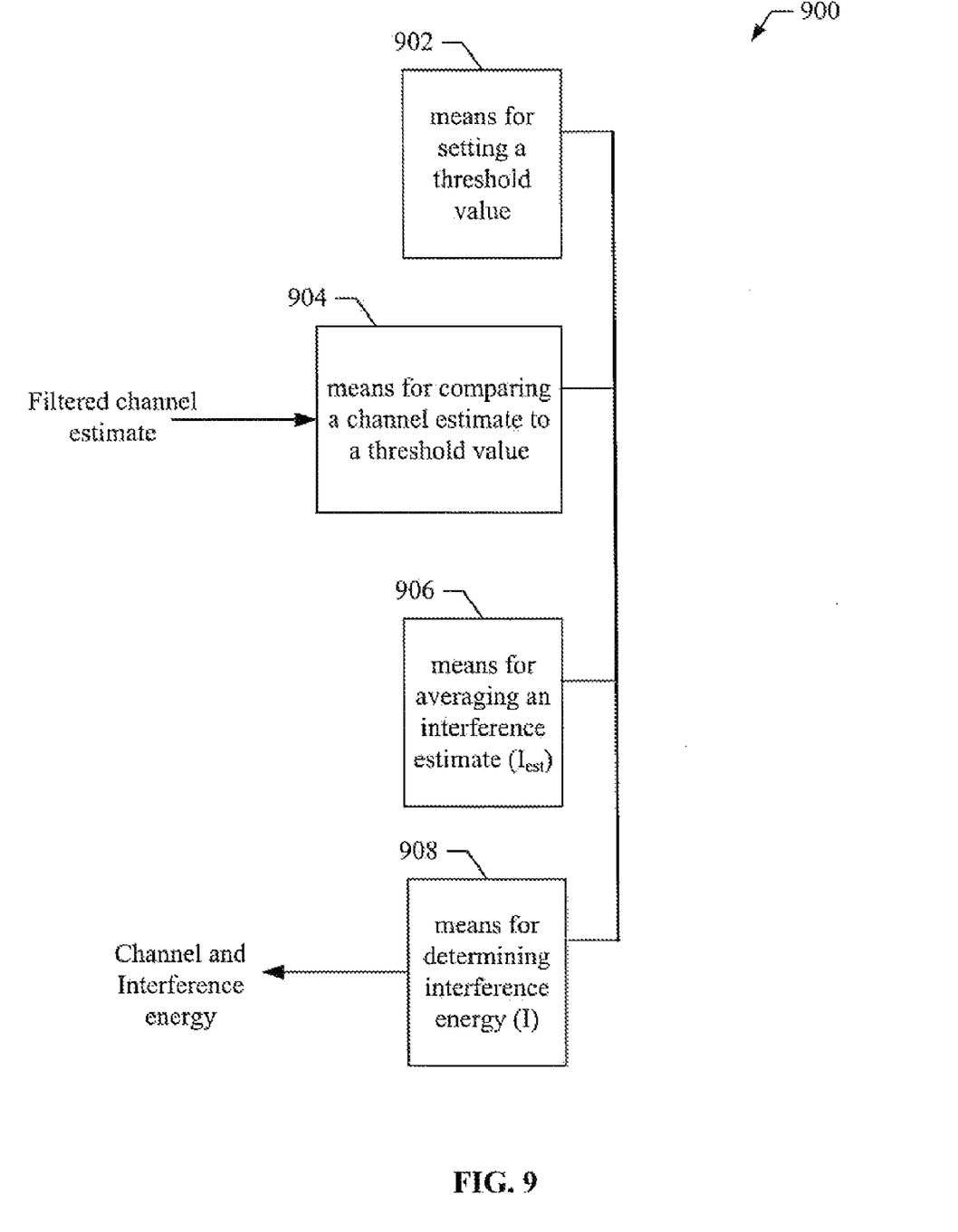
FIG. 9 shows an aspect of an estimation system.

FIG. 9 shows an aspect of an estimation system 900. The estimation system 900 comprises means (902) for setting a threshold value. For example, in an aspect, the means 902 comprises the threshold logic 412. The estimation system 900 also comprises means (904) for comparing a filtered channel estimate to a threshold value. For example, in an aspect, the means 904 comprises the threshold logic 412. The estimation system 900 also comprises means (906) for averaging an interference estimate. For example, in an aspect, the means 906 comprises the divide logic 610. The estimation system 900 also comprises means (908) for determining interference energy. For example, the means 908 comprises the summing logic 608.

In an aspect, the means 902, 904,906, and 908 are implemented by at least one processor configured to execute program instructions to provide aspects of an estimation system as described herein.

Therefore various illustrative logics, logical blocks, modules, and circuits described in connection with tire aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of an estimation system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for determining signal and interference energy, the method comprising:
    setting a threshold value;
    determining an interference estimate ($I_{est}$) by comparing a channel estimate to the threshold value;
    averaging the interference estimate ($I_{est}$) to determine average channel interference ($I_c$); and
    determining, using a receiving device, interference energy (I) based on the interference estimate ($I_{est}$) and the average channel interference ($I_c$).

2. The method of claim 1, further comprising:
    comparing the channel estimate to the threshold value to determine a signal estimate ($C_{est}$); and
    determining signal energy (C) based on the signal estimate ($C_{est}$) and the average channel interference ($I_c$).

3. The method of claim 2, further comprising adjusting the threshold value based on the signal estimate ($C_{est}$).

4. The method of claim 2, further comprising subtracting the average channel interference $I_c$ from the signal estimate $C_{est}$ to determine the signal energy C.

5. The method of claim 1, wherein said determining comprises adding the $I_c$ to the $I_{est}$ to determine the interference energy I.

6. The method of claim 1, wherein said averaging comprises:
    dividing the interference estimate $I_{est}$ by a first count ($N_i$) that indicates how many samples of the channel estimate are below the threshold value to determine an interference average ($I_{avg}$); and
    multiplying the $I_{avg}$ by a second count ($N_c$) that indicates how many samples of the channel estimate are above the threshold value to determine the average channel interference $I_c$.

7. The method of claim 1, wherein said setting comprises setting the threshold value based on a reference indicator.

8. The method of claim 1, further comprising generating a truncation window that identifies a portion of the channel estimate as an interference portion, and wherein the interference portion is used to determine the interference estimate ($I_{est}$).

9. The method of claim 1, further comprising obtaining the channel estimate by time filtering one or more symbols.

10. The method of claim 1, further comprising subtracting the interference estimate $I_{est}$ from a received signal strength indicator to determine signal energy C.

11. An apparatus for determining signal and interference energy, the apparatus comprising:
    one or more processors having:
    threshold logic configured to set a threshold value and compare a channel estimate to the threshold value to determine an interference estimate ($I_{est}$);
    averaging logic configured to average the interference estimate ($I_{est}$) to determine average channel interference ($I_c$); and
    summing logic configured to determine interference energy (I) based on the interference estimate ($I_{est}$) and the average channel interference ($I_c$).

12. The apparatus of claim 11, wherein said threshold logic is further configured to compare the channel estimate to the threshold value to determine a signal estimate ($C_{est}$); and further comprising logic configured to determine signal energy (C) based on the signal estimate ($C_{est}$) and the average channel interference ($I_c$).

13. The apparatus of claim 12, further comprising subtraction logic configured to determine the signal energy (C) based on subtraction of the average channel interference ($I_c$) from the signal estimate ($C_{est}$).

14. The apparatus of claim 12, wherein said threshold logic is further configured to adjust the threshold value based on the signal estimate ($C_{est}$).

15. The apparatus of claim 11, wherein said averaging logic comprises:
    dividing logic configured to divide the interference estimate $I_{est}$ by a first count ($N_i$) that indicates how many samples of the filtered channel estimate are below the threshold value to determine an interference average ($I_{avg}$); and
    multiplying logic configured to multiply the $I_{avg}$ by a second count ($N_c$) that indicates how many samples of the filtered channel estimate are above the threshold value to determine the average channel interference $I_c$.

16. The apparatus of claim 11, wherein said threshold logic is further configured to set the threshold value based on a reference indicator.

17. The apparatus of claim 11, further comprising truncation logic configured to generate a truncation window that identifies a portion of the channel estimate as an interference portion and to use the interference portion to determine the interference estimate ($I_{est}$).

18. The apparatus of claim 11, further comprising logic configured to obtain the channel estimate by time filtering one or more symbols.

19. The apparatus of claim 11, further comprising logic configured to subtract the interference estimate IeS1 from a received signal strength indicator (R) to determine signal energy C.

20. The apparatus of claim 11, wherein said summing logic determines the interference energy (I) based on addition of the average channel interference ($I_c$) to the interference estimate ($I_{est}$).

21. An apparatus for determining signal and interference energy, the apparatus comprising:
    means for setting a threshold value;
    means for determining an interference estimate ($I_{est}$) by comparing a channel estimate to the threshold value;
    means for averaging the interference estimate ($I_{est}$) to determine average channel interference ($I_c$); and
    means for determining interference energy (I) based on the interference estimate ($I_{est}$) and the average channel interference ($I_c$).

22. The apparatus of claim 21, further comprising:
    means for comparing the channel estimate to the threshold value to determine a signal estimate ($C_{est}$); and
    means for determining signal energy (C) based on the signal estimate ($C_{est}$) and the average channel interference ($I_c$).

23. The apparatus of claim 22, further comprising means for adjusting the threshold value based on the signal estimate ($C_{est}$).

24. The apparatus of claim 22, further comprising means for subtracting the average channel interference $I_c$ from the signal estimate $C_{est}$ to determine the signal energy C.

25. The apparatus of claim 21, wherein said means for determining comprises means for adding the $I_c$ to the $I_{est}$ to determine the interference energy I.

26. The apparatus of claim 21, wherein said means for averaging comprises:
    means for dividing the interference estimate $I_{est}$ by a first count ($N_i$) that indicates how many samples of the filtered channel estimate are below the threshold value to determine an interference average ($I_{avg}$); and
    means for multiplying the $I_{avg}$ by a second count ($N_c$) that indicates how many samples of the filtered channel estimate are above the threshold value to determine the average channel interference $I_c$.

27. The apparatus of claim 21, wherein said means for setting comprises means for setting the threshold value based on a reference indicator.

28. The apparatus of claim 21, further comprising means for generating a truncation window that identifies a portion of the channel estimate as an interference portion and for using the interference portion to determine the interference estimate ($I_{est}$).

29. The apparatus of claim 21, further comprising means for obtaining the channel estimate by time filtering one or more symbols.

30. The apparatus of claim 21, further comprising means for subtracting the interference estimate $I_{est}$ from a received signal strength indicator to determine signal energy C.

31. A non-transitory computer-readable storage medium having stored thereon a computer program comprising instructions, which when executed by at least one processor, operate to determine signal and interference energy, the computer-readable storage medium comprising:
    instructions for setting a threshold value;
    instructions for determining an interference estimate ($I_{est}$) by comparing a channel estimate to the threshold value;
    instructions for averaging the interference estimate ($I_{est}$) to determine average channel interference ($I_c$); and
    instructions for determining interference energy (I) based on the interference estimate ($I_{est}$) and the average channel interference ($I_c$).

32. The non-transitory computer-readable storage medium of claim 31, further comprising:
    instructions for comparing the channel estimate to the threshold value to determine a signal estimate ($C_{est}$); and
    instructions for determining signal energy (C) based on the signal estimate ($C_{est}$) and the average channel interference ($I_c$).

33. The non-transitory computer-readable storage medium of claim 32, further comprising instructions for adjusting the threshold value based on the signal estimate ($C_{est}$).

34. The non-transitory computer-readable storage medium of claim 32, further comprising instructions for subtracting the average channel interference I from the signal estimate $C_{est}$ to determine the signal energy C.

35. The non-transitory computer-readable storage medium of claim 31, wherein said instructions for determining comprise instructions for adding the $I_c$ to the $I_{est}$ to determine the interference energy I.

36. The non-transitory computer-readable storage medium of claim 31, wherein said instructions for averaging comprise:
    instructions for dividing the interference estimate $I_{est}$ by a first count ($N_i$) that indicates how many samples of the filtered channel estimate are below the threshold value to determine an interference average ($I_{avg}$); and
    instructions for multiplying the $I_{avg}$ by a second count ($N_c$) that indicates how many samples of the filtered channel estimate are above the threshold value to determine the average channel interference $I_c$.

37. The non-transitory computer-readable storage medium of claim 31, wherein said instructions for setting comprise instructions for setting the threshold value based on a reference indicator.

38. The non-transitory computer-readable storage medium of claim 31, further comprising instructions for generating a truncation window that identifies a portion of the channel estimate as an interference portion and for using the interference portion to determine the interference estimate ($I_{est}$).

39. The non-transitory computer-readable storage medium of claim 31, further comprising instructions for obtaining the channel estimate by time filtering one or more symbols.

40. The non-transitory computer-readable storage medium of claim 31, further comprising instructions for subtracting the interference estimate $I_{est}$ from a received signal strength indicator to determine signal energy C.

41. A method for determining signal and interference energy, the method comprising:
    setting a threshold value;
    defining a truncation window;
    determining an interference estimate ($I_{est}$) by comparing a filtered channel estimate within the truncation window to the threshold value;
    averaging the interference estimate ($I_{est}$) to determine average channel interference ($I_c$); and
    determining, using a receiving device, interference energy (I) based on the interference estimate ($I_{est}$) and the average channel interference ($I_c$).

42. The method of claim 41, further comprising:
    comparing the filtered channel estimate outside the truncation window to the threshold value to determine a signal estimate ($C_{est}$); and
    determining signal energy (C) based on the signal estimate ($C_{est}$) and the average channel interference ($I_c$).

43. The method of claim 42, further comprising subtracting the average channel interference I from the signal estimate $C_{est}$ to determine the signal energy C.

* * * * *